US006418089B1

United States Patent
Nishino

(10) Patent No.: US 6,418,089 B1
(45) Date of Patent: Jul. 9, 2002

(54) REPRODUCTION APPARATUS AND REPRODUCTION METHOD PROVIDING REDUCED POWER CONSUMPTION, EVEN WHEN USING MAGNETICALLY INDUCED SUPER RESOLUTION (MSR), BY NOT APPLYING BIASED MAGNETIC FIELD TO RECORDING MEDIUM DURING STILL OPERATION

(75) Inventor: Masatoshi Nishino, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/339,513

(22) Filed: Jun. 24, 1999

(30) Foreign Application Priority Data

Jun. 30, 1998 (JP) ............................. 10-184580

(51) Int. Cl.[7] .............................................. G11B 11/00
(52) U.S. Cl. ..................................... 369/13.14; 369/13.4
(58) Field of Search ..................... 369/13, 32, 44.34, 369/44.35, 275.2, 53.2, 53.11, 59.1, 47.1, 13.07, 13.05, 13.02, 13.04, 13.11, 13.14, 13.17, 13.2, 53.26, 53.37, 47.31, 53.22, 13.21, 13.4

(56) References Cited

U.S. PATENT DOCUMENTS 5,579,294 A * 11/1996 Ohta et al. ..................... 369/58
5,883,863 A * 3/1999 Itakura et al. ................. 369/13
5,959,942 A * 9/1999 Taguchi et al. ................ 369/13

* cited by examiner

Primary Examiner—Ali Neyzari
(74) Attorney, Agent, or Firm—Oblon, Spivak, McClelland, Maier & Neustadt, P.C.

(57) ABSTRACT

A bias magnet (magnetic head) is driven when data is read from an MSR disk. When data reading is awaited in a condition in which "reproduction still" is turned on, the bias magnet is not driven.

5 Claims, 5 Drawing Sheets

REPRODUCTION APPARATUS AND REPRODUCTION METHOD PROVIDING REDUCED POWER CONSUMPTION, EVEN WHEN USING MAGNETICALLY INDUCED SUPER RESOLUTION (MSR), BY NOT APPLYING BIASED MAGNETIC FIELD TO RECORDING MEDIUM DURING STILL OPERATION

BACKGROUND OF THE INVENTION

1. Field of the Invention

The present invention relates to reproduction apparatuses and reproduction methods, and more particularly, to a reproduction apparatus and a reproduction method for a recording medium of a reproduction type in which data is reproduced by irradiating with laser light and applying a magnetic field.

2. Description of the Related Art

As a recording medium that allows data to be rewritten (overwritten), magneto-optical disks are known.

There are known, for example, a light-intensity-modulation overwrite method and a magnetic-modulation overwrite method to perform recording in the magneto-optical disks.

In the light-intensity-modulation overwrite method, an external magnetic field having a constant bias is applied to a magneto-optical recording film (signal recording surface) of a magneto-optical disk, and the n the film is irradiated with laser pulses having a required power and modulated by recording data. With these operations, a part of th e magneto-optical recording film irradiated with the laser pulses and heated has the magnetization direction corresponding to the external magnetic field, and hence a recording pit is formed.

There have been proposed several types of magnetic-modulation overwrite methods. Basically, the magneto-optical recording film is irradiated with laser light having a recording level, and then an external magnetic field modulated by recording data is applied. With these methods, a area having the magnetization direction corresponding to the polarity of the external magnetic field is formed, and hence, a recording pit is formed.

To reproduce data from a magneto-optical disk in which the data has been recorded in one of the foregoing ways, the magneto-optical recording film, which serves as a signal recording surface, is irradiated with laser light by an optical pickup. The laser light reflected from the magneto-optical recording film rotates its polarizing plane by a so-called magnetic Kerr effect. The optical pickup reads a recording pit, namely, reproduces the data with the use of light-amount differences of the reflected light, obtained from the magnetic Kerr effect.

Therefore, when a magneto-optical disk is used, a magnetic field is required to be applied during recording in any of the above methods, but a magnetic field is not necessarily required to be applied during reproduction.

The applicant of the present application has already proposed a magnetically induced super resolution (MSR) method to enable higher-density recording in an magneto-optical disk.

In this MSR method, to describe it simply, information recorded in an area smaller than a laser spot diameter is read by the use of a plurality of magnetic-film layers having different temperature characteristics.

To reproduce data from a disk by the MSR method, it is necessary to constantly apply an external magnetic field having a required constant bias to the magnetic film of the disk. Therefore, a disk drive apparatus that allows data to be reproduced from a magneto-optical disk by the MSR method needs to be provided with a structure for generating the external magnetic field. The structure may include, for example, a magnet and a driving circuit for driving the magnet to generate a magnetic field.

To generate a magnetic field from the magnet, it is necessary, for example, to output a driving current from the driving circuit to the magnet. Conversely, as described above, since an external magnetic field is unnecessary during reproduction for a magneto-optical disk not employing the MSR method, it is unnecessary to cause a driving current to flow into the magnet.

Consequently, in terms of power consumption during reproduction, the MSR method is inferior because it requires the driving current.

SUMMARY OF THE INVENTION

Accordingly, it is an object of the present invention to reduce power consumption required for generating an external magnetic field as much as possible even in a reproduction method that needs the external magnetic field to be applied during reproduction.

The foregoing object is achieved in one aspect of the present invention through the provision of a reproduction apparatus for reproducing a signal recorded by magnetizing a recording layer, from a recording medium by transferring the direction of the magnetization to a reproduction layer, including an optical pickup for emitting laser light to a predetermined position on the recording medium; a magnetic-field generation means disposed correspondingly to the optical pickup, for applying a biased magnetic field to the recording medium for signal reproduction; and control means for performing at least a reproduction operation in which the optical pickup is moved above the recording medium and a signal is read from the recording medium, and a still operation in which the optical pickup is held at a predetermined position above the recording medium and a signal is not read from the recording medium, wherein the control means drives the magnetic-field generation means during the reproduction operation to apply a biased magnetic field to a position on the recording medium where laser light is irradiated, and stops driving the magnetic-field generation means during the still operation so as not to apply a biased magnetic field to the recording medium.

The foregoing object is achieved in another aspect of the present invention through the provision of a reproduction method for reproducing a signal recorded by magnetizing a recording layer, from a recording medium by transferring the direction of the magnetization to a reproduction layer, including the steps of determining the type of the recording medium by emitting laser light to a predetermined position on the recording medium; applying a biased magnetic field for signal reproduction to a position where the laser light is irradiated, according to the determination result; and controlling such that at least a reproduction operation for reading a signal from the recording medium and a still operation in which an optical pickup is held at a predetermined position above the recording medium and a signal is not read from the recording medium are performed, and a biased magnetic field is not applied to the recording medium during the still operation.

With the above structure, a magnetic field is not applied to a recording medium in a period when an operation is not executed to read data from the recording medium. In other words, a driving power for applying the magnetic field is unnecessary during this period.

DESCRIPTION OF THE PREFERRED EMBODIMENT

An embodiment of the present invention will be described below. A reproduction apparatus according to the present embodiment of the present invention is, for example, mounted on a disk drive apparatus having a structure that allows recording and reproduction of a magneto-optical disk with a compatibility of an MSR-method disk (hereinafter called an MSR disk) and a conventional disk (hereinafter called an MO disk) not conforming to the MSR method.

Before the disk drive apparatus according to the present embodiment is described, the MSR disk will be described first.

In the MSR disk, a data string formed in a spiral track on the disk is formed of consecutive sectors.

Figure 1:
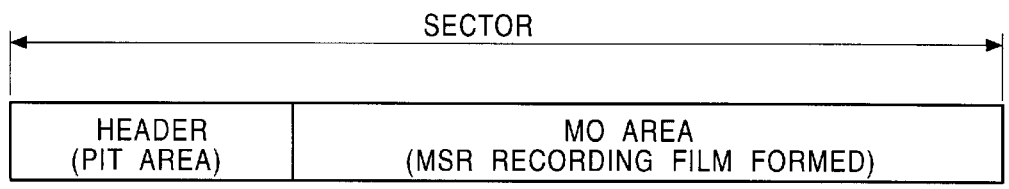
FIG. 1 is a view showing a part of a disk according to an embodiment of the present invention.

One sector is divided into a header and an MO area as shown in FIG. 1.

The header is a reproduction-only area in which data, such as an address as described later, is recorded with so-called embossed pits. In the MO area, magneto-optical recording and reproduction are allowed and user data, for example, is recorded.

In this MSR disk, an MSR recording film is formed in the MO area. Data is reproduced by the MSR reproduction method from this area. Therefore, a data recording density of about twice that in the conventional MO disk (an octuple-density disk) is implemented.

It is assumed that a 1-7 run-length limited code modulation method (hereinafter called a 1-7 RLL), for example, is employed.

Since the recording density is about twice that of the conventional MO disk, the frequency of a reproduction clock also becomes about twice that for the conventional MO disk. When the clock frequency of the conventional MO disk is set to fc, for example, the frequency of the reproduction clock in the MO area of the present embodiment is 2fc.

The MSR reproduction method will be described next by referring to FIG. 2.

FIG. 2(a) shows a recording track Dt and a spot Bs of a laser beam irradiated on it. FIG. 2(b) shows a part of a cross section of a magneto-optical disk.

To obtain an MSR effect, the magneto-optical disk needs to have a recording layer and a reproduction layer having different magnetic characteristics according to temperatures, as shown in FIG. 2(b). The reproduction layer serves as a mask layer Ms that masks the recording layer from the beam spot Bs of the laser beam Lb.

It is understood from FIG. 2(a) and FIG. 2(b) that the reproduction layer is irradiated with laser light having a reproduction power to form a small window (aperture Ap) on the reproduction layer, and the magnetization direction mt of the recording bit Rb in the recording layer, which is disposed under the aperture, is transferred to the aperture Ap. The recording bits Rb recorded in a high density can be read even with the laser beam Lb having a large spot diameter, by observing the magnetization directions mt transferred to the reproduction layer.

Irradiating the laser beam Lb having the reproduction laser power in this way transfers the magnetization direction mt from the recording layer to the reproduction layer. Since the reproduction laser power controls the size of the aperture Ap, which is the area for which transfer is performed from the recording layer to the reproduction layer, the frequency characteristics of a signal reproduced from the disk can be extended if the reproduction laser power is appropriately controlled.

Even if the same beam spot diameter as in the conventional case is used, for example, twice or more higher-density recording and reproduction is allowed with the use of such an MSR technology.

In the disk according to the present embodiment, the MSR-method recording and reproduction described above is performed in the MO area shown in FIG. 1. Recording is possible, for example, with a magnetic modulation method.

Figure 3:
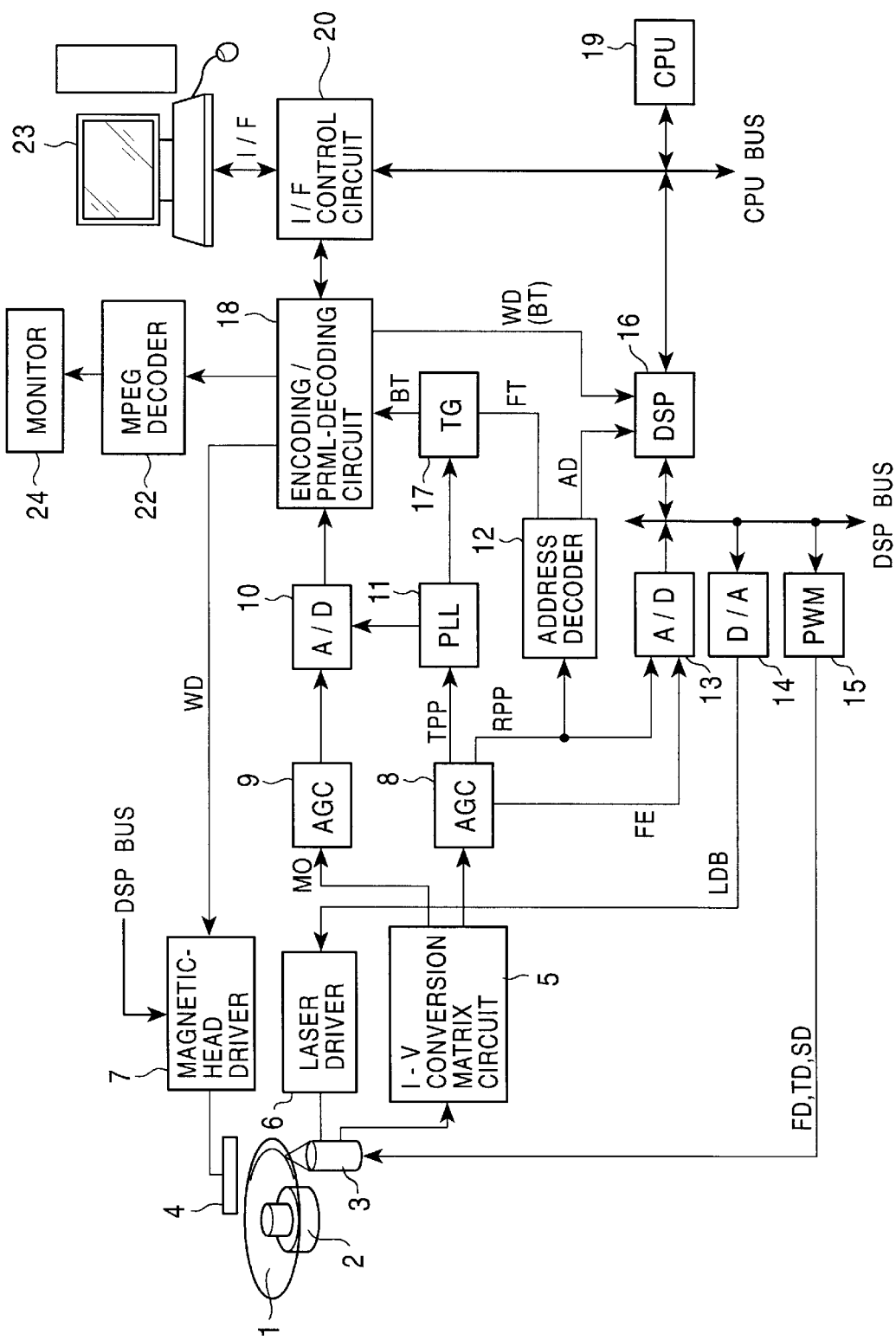
FIG. 3 is a block diagram showing a structure of a disk drive apparatus of the present embodiment.

The disk drive apparatus according to the present embodiment will be described next by referring to FIG. 3.

A disk 1 shown in this figure is, for example, either an MO disk or an MSR disk described before, and is rotated by a spindle motor 2. A spindle servo control circuit not shown controls the rotation speed of the spindle motor 2.

An optical pickup 3 is provided with an optical system formed of a laser diode serving as a light source emitting laser light, an objective serving as the output end of the laser light, a photodetector for receiving light (laser light) reflected from the disk and for converting it to an electric signal, a beam splitter for guiding reflected light to the photodetector, and a cylindrical lens, and a two-axis mechanism for holding the objective such that it can be moved in the disk-radial direction (tracking direction) and a direction (focus direction) in which it approaches or retracts from a disk surface.

A bias magnet (magnetic head) 4 is disposed at a position opposing the optical pickup 3 against the disk 1. In this case, the bias magnet 4 has a size and a shape that, for example, allow a magnetic field to be applied to all areas in the disk-radial direction.

This bias magnet 4 is provided in the present embodiment to generate an external magnetic field and to apply it to the disk during recording in the disk 1. When the disk 1 is of the MSR type, a biased magnetic field having a required constant strength is generated even during reproduction to obtain a reproduction effect of the MSR method described above by referring to FIG. 2.

Figure 2:
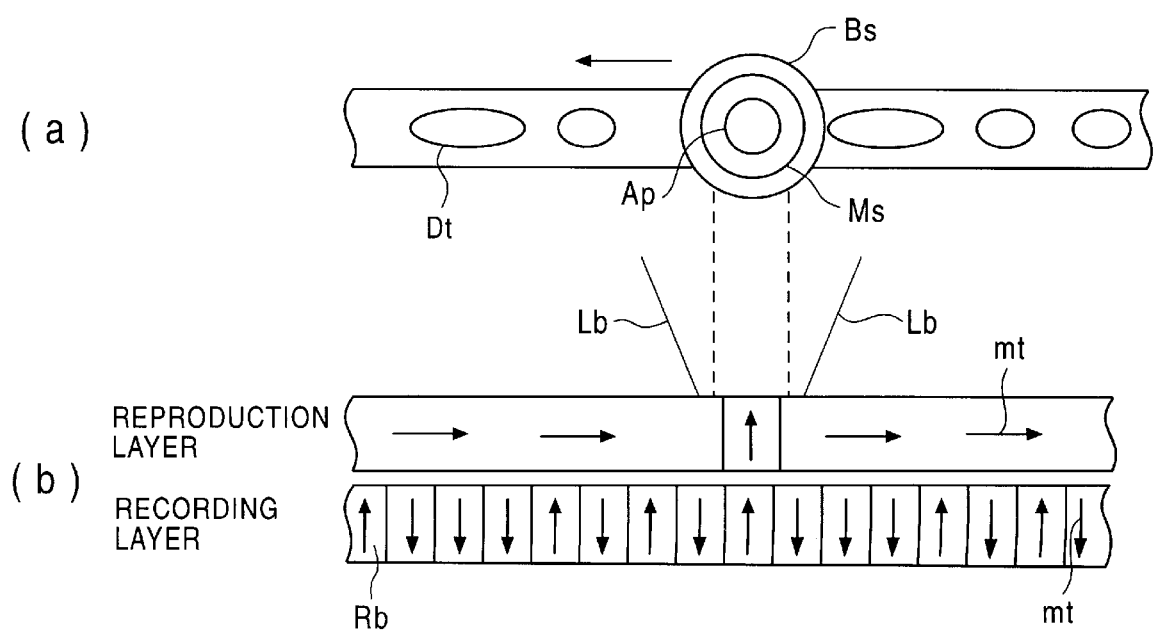
FIG. 2 is a view showing a part of an MSR disk in the present embodiment.

In the MSR method described with FIG. 2, a magnetic field is required to be applied to the reproduction layer to make it serve as the mask layer Ms. In the disk drive apparatus of the present embodiment, the bias magnet (magnetic head) 4 is used to apply a magnetic field.

Magnetic-field generation control for the bias magnet 4 is, for example, implemented by a digital signal processor (DSP) 16, which controls a magnetic-head driver 7 through a DSP bus. The magnetic-head driver 7 causes a driving current to flow into the bias magnet 4 according to the control through the DSP bus (or input recording data WD), and thereby the bias magnet 4 generates a magnetic field having required strength and polarity.

The optical pickup 3 described above is held by a sled mechanism not shown such that it can be moved in the disk radial direction.

In this case, the sled mechanism is moved by sled servo control of the DSP 16. More specifically, the DSP 16 generates a sled control signal according to a reproduction state and outputs it as a sled drive signal SD through a pulse width modulation (PWM) circuit 15 via the DSP bus. With this operation, control is performed such that, for example, the sled mechanism is moved according to a change in the reproduction position during reproduction and the mechanism is moved during seeking.

The laser diode of the optical pickup 3 is driven by a laser driver 6 such that the laser diode emits laser light to the disk 1 with the objective serving as the output end. This irradiated light is reflected from the disk surface, returns through the objective as reflection light, and is condensed on the photodetector through the beam splitter and the cylindrical lens.

Figure 4:
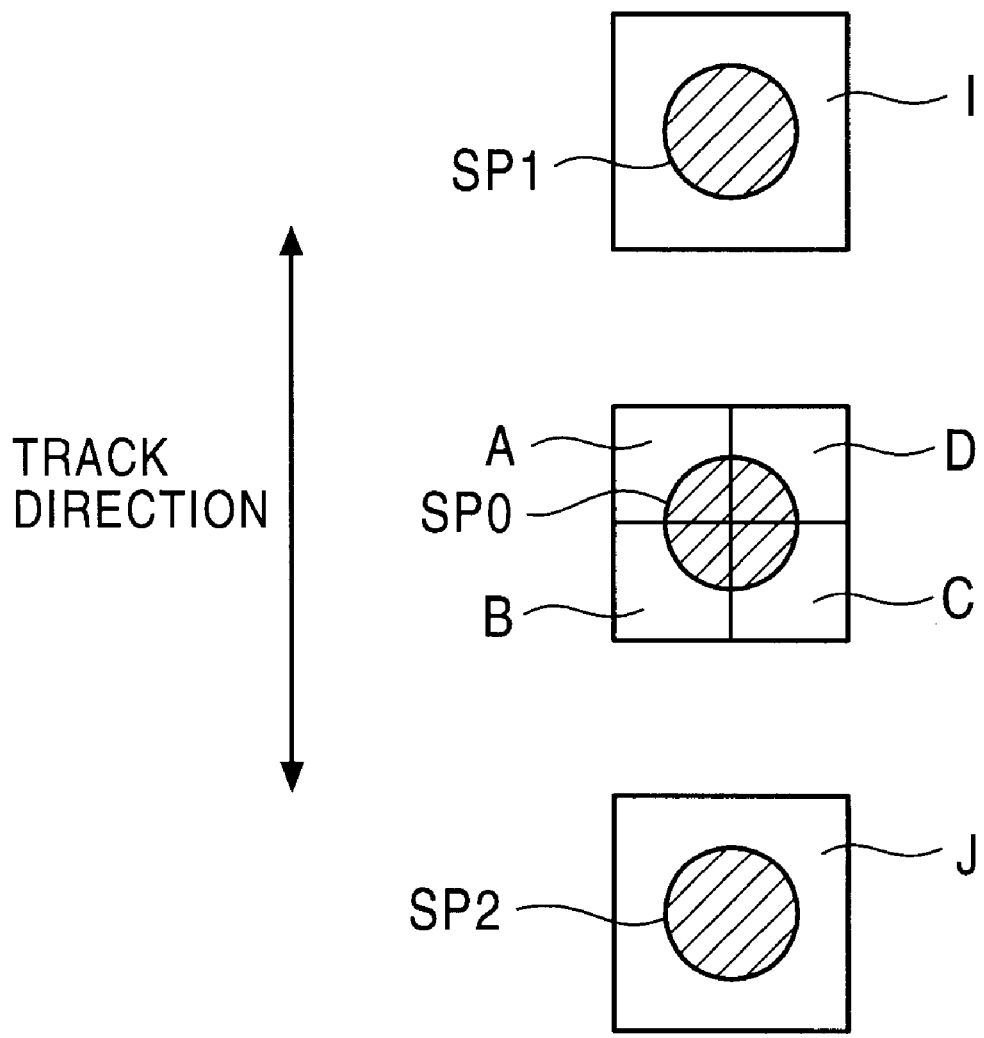
FIG. 4 is a view showing a structural example of a photodetector provided for the disk drive apparatus of the present embodiment.

The photodetector receives this reflected light, obtains a detection signal, and outputs it to an I-V conversion matrix circuit 5. The detection signal obtained by the photodetector is a current signal. The I-V conversion matrix circuit 5 converts this current detection signal to a voltage signal and executes various matrix calculation processing, described later, to generate various servo signals and a reproduction signal MO. FIG. 4 shows the photodetector, provided for the optical pickup 3.

As shown in this figure, the photodetector receives a 0th-order optical spot SP0 reflected from the disk 1. The photodetector is formed of light-receiving devices A, B, C, and D divided into four and light-receiving devices I and J for receiving optical spots SP1 and SP2 divided by the beam splitter, respectively. These light-receiving devices are disposed in the track direction in the arrangement condition shown in the figure.

The I-V conversion matrix circuit 5 applies calculation processing, for example, in the following way to a detection signal obtained by each of the light-receiving devices A, B, C, D, I, and J to obtain various servo signals and the reproduction signal MO.

A focus error signal FE used for focus servo is obtained by performing a calculation of FE=(A+C)−(B+D).

A tracking error signal used for tracking servo is obtained by a calculation of (A+D)−(B+C) according to a so-called push-pull method. This calculation method is also called a radial push-pull method, and the tracking error signal obtained by the foregoing calculation is referred to here as an RPP signal.

The reproduction signal MO is obtained by a calculation of MO=I−J with the use of the detection signals obtained by the light-receiving devices I and J for a magneto-optical disk.

The I-V conversion matrix circuit 5 also performs a calculation along the disk tangential direction by the push-pull method, that is, a calculation of (A+B)−(C+D). This is also called a tangential push-pull method, and the signal obtained by the above calculation is referred to hereinafter as a TPP signal.

The focus error signal FE, the RPP signal, and the TPP signal are input to an automatic gain control (AGC) circuit 8 for gain control. The focus error signal FE is converted to a digital signal by an A/D converter 13 and input to the DSP 16 through the DSP bus. The RPP signal is input to an address decoder 12 and to the A/D converter 13. The RPP signal input to the A/D converter 13 is converted to a digital signal, input to the DSP 16, and used as a tracking error signal.

The TPP signal is input to a PLL circuit 11. The reproduction signal MO is input to an AGC circuit 9.

Figure 5:
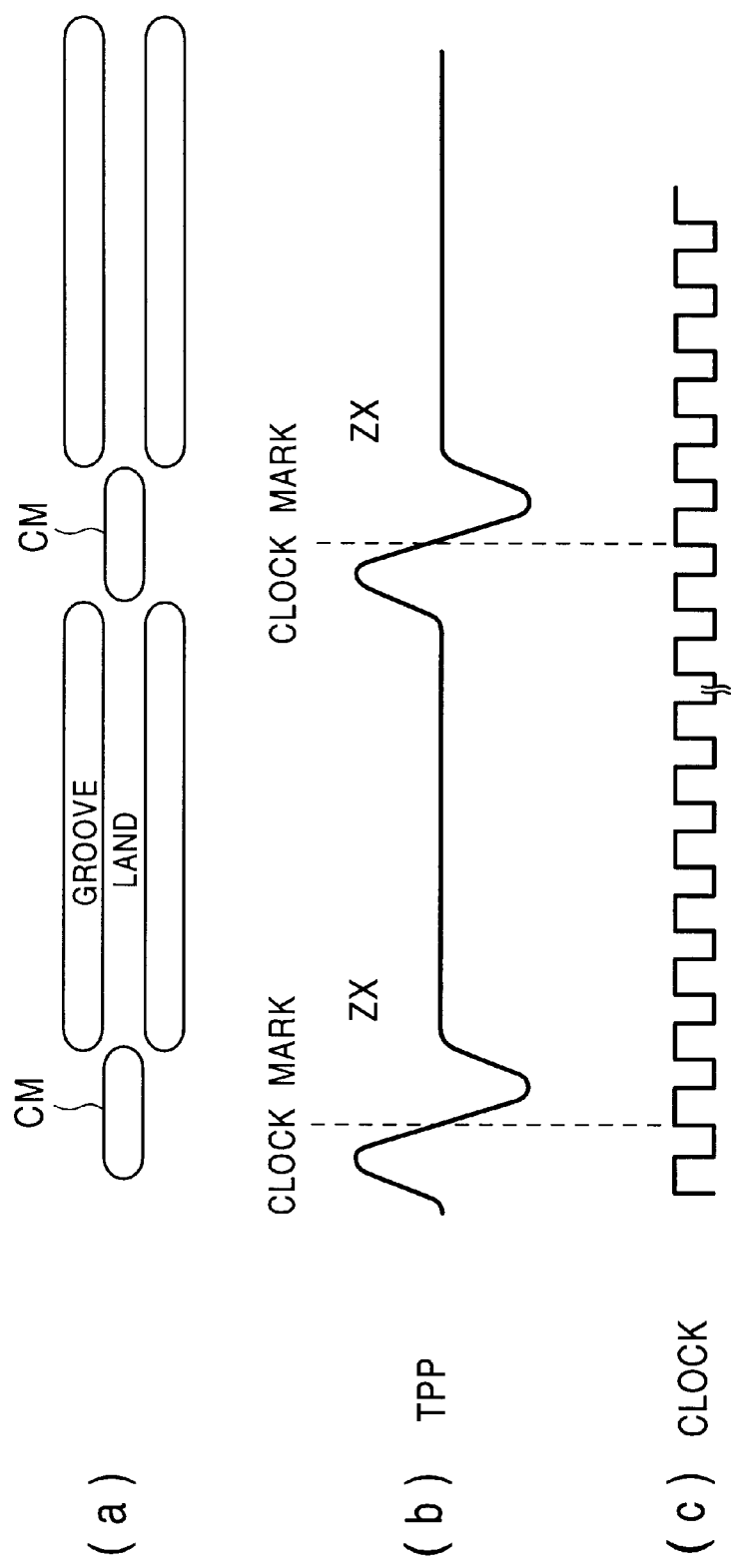
FIG. 5 is a view showing a clock generation operation based on clock marks on the disk.

The PLL circuit 11 is provided in order to extract clock information by the use of a clock mark signal included in the TPP signal. FIG. 5 shows an extract operation of the clock information, performed by the PLL circuit 11.

An MO disk and an MSR disk, both of which are used in the present embodiment, have a physical disk format shown in FIG. 5(*a*). In this figure, clock marks CM are formed in a land section. The clock marks CM are formed such that, for example, one turn of the disk includes the predetermined number of clock marks. Grooves serve as data recording areas (track). Although not shown in this figure, the grooves are formed to have wobbling (meander) with the use of address information which is, for example, FM-modulated or FSK-modulated. In other words, wobbling is made for the grooves to record address information.

The TPP signal, described above, obtained from the disk 1 having the disk format shown in FIG. 5(*a*) has S-shaped curves correspondingly to the passage of clock marks CM as shown in FIG. 5(*b*).

The PLL circuit 11 detects the S-shaped curves in the TPP signal shown in FIG. 5(*b*) as clock-mark signals, and compares in phase the zero-crossing positions ZX at their centers with a signal obtained by dividing a frequency signal output from an internal voltage controlled oscillator (VCO) to synchronize the detection timings of the clock-mark signals with the internal clock. This clock is output as a reference clock.

The clock generated by the PLL circuit 11 is output to a timing generator (TG) 17. The TG 17 generates a data synchronization signal, an address position signal, and timing signals for detection according to the input clock, and outputs them.

In this case, the timing signals include a bit timing signal BT output to an encoding/PRML-decoding circuit 18 and a frame synchronization signal FT output to the address decoder 12.

The address decoder 12 extracts address information from the RPP signal, which is input through the AGC circuit 8, by using the frame synchronization signal FT. The high-frequency portion of the RPP signal includes the address information recorded by the use of groove wobbling. The address information included in the RPP signal is extracted by converting the RPP signal to a binary signal, applying biphase conversion, and applying CRC checking. This address information AD is sent to the DSP 16.

The DSP 16 performs seek control during data reading, and sector position management and control during recording and reproduction, according to the address information AD.

The DSP 16 also sets a required laser power according to a recording and reproduction condition to perform laser emission control for the optical pickup 3.

The DSP 16 also executes various types of servo control.

For example, the DSP 16 generates focus control data for driving a focus coil of the two-axis mechanism, according to the input focus error signal FE. The focus control data is sent to the PWM circuit 15, and output to the focus coil as a focus-coil drive signal FD. With this signal, focus leading control for leading the objective position so as to focus on a signal recording surface is performed, and focus servo control for maintaining the condition in which the objective position remains so as to focus on the signal recording surface is performed by a closed loop.

Tracking servo control, which controls such that the spot of the laser light appropriately traces the track, is, for example, performed in the following way.

The tracking error signal is included in a low-frequency component of the RPP signal. Therefore, the DSP 16, for example, removes a high-frequency component from the input RPP signal to extract the low-frequency component and uses it as the tracking error signal. The DSP 16 generates tracking control data for driving a tracking coil of the two-axis mechanism according to the tracking error signal and sends it to the PWM circuit 15.

The tracking control data is converted to a tracking-coil drive signal TD by the PWM circuit 15, and sent to the tracking coil. With this signal, tracking servo control is performed.

The DSP 16 further performs sled servo control for moving the sled mechanism such that the optical pickup 3 accesses a required position or is moved there according to a reproduction condition.

The AGC circuit 9 adjusts the amplitude fluctuation of the reproduction signal MO generated by the I-V conversion matrix circuit 5, and sends the signal to an A/D converter 10. The A/D converter 10 operates according to the clock generated by the PLL circuit 11.

More specifically, the A/D converter 10 samples the reproduction signal MO, which is an input RF signal, at a sampling frequency generated according to the clock to digitize the signal, applies waveform equalization by using a built-in digital equalizer, and sends it to a PRML decoding section in the encoding/PRML-decoding circuit 18.

The PRML decoding section in the encoding/PRML-decoding circuit 18 decodes the reproduction signal MO output from the A/D converter 10 by PRML. PRML is a signal processing method in which a partial response (PR) method, which is one of waveform equalization methods which allow data to be reproduced even if pulse shape interlope occurs in the waveform corresponding to the data, is combined with a Viterbi composite method, which reproduces a data string having the greatest likelihood if the waveform includes noise. The encoding/PRML-decoding circuit 18 demodulates, for example, by a non-return-to-zero inverted method, binary data obtained by the Viterbi composite method, releases error correcting codes, and outputs it as reproduction data.

The reproduction data output from the encoding/PRML-decoding circuit 18 is sent through an I/F control circuit 20 serving as an interface circuit to a host computer 23 via, for example, a small computer system interface (SCSI) signal line. When data recorded into the disk 1 is video data compressed by the moving picture experts group (MPEG) method, the compressed reproduction data output from the encoding/PRML-decoding circuit 18 is sent to an MPEG decoder 22. The MPEG decoder 22 decompresses the compressed reproduction data according to the MPEG standard. The reproduction video data is then sent, for example, to a monitor 24 and displayed.

When data is recorded into the disk 1, the data is sent from the host computer 23, for example, and is then sent to an encoding section of the encoding/PRML-decoding circuit 18 through the I/F control circuit 20.

The encoding section adds error correcting codes to the data sent through the I/F control circuit 20, applies a predetermined encoding processing, and performs a predetermined demodulation for recording the data into the disk 1 to generate a recording signal WD which has been, for example, synchronized with the bit timing signal BT.

When recording is performed, for example, by the light-intensity-modulation overwrite method to the disk 1, which is a magneto-optical disk, this recording signal WD is sent to the DSP 16. The DSP 16 generates laser driving data modulated by the recording signal WD and outputs it to a D/A converter 14 through the DSP bus. The D/A converter 14 converts it to a laser-diode driving voltage LDB and outputs to the laser driver 6. With these operations, the laser diode in the optical pickup 3 emits light pulses modulated by the recording data WD. On the other hand, the DSP 16 controls, for example, the magnetic-head driver 7 through the DSP bus such that the bias magnet 4 generates, for example, a magnetic field having a required constant level and applies it to the disk 1. With these operations, data recording is implemented by the light-intensity-modulation overwrite method.

When recording is performed by a magnetic-modulation overwrite method (a simple magnetic-modulation method is taken as an example here), the recording signal WD generated in the encoding section of the encoding/PRML-decoding circuit 18 is sent to the magnetic-head driver 7. The magnetic-head driver 7 drives the bias magnet 4 according to the recording signal WD, and thereby the bias magnet 4 generates an N or S magnetic field according to the recording data and applies it to the disk. On the other hand, the DSP 16 generates laser drive data which specifies the laser power corresponding to a required recording level, and outputs it to the laser driver 6 through the D/A converter 14 as the laser-diode driving voltage LDB. Then, the laser diode in the optical pickup 3 emits light having the laser power corresponding to the recording level.

The external magnetic field modulated by the recording data is applied and at the same time, the laser light having the laser power corresponding to the recording level is emitted in this way. Recording by the magnetic-modulation overwrite method is thus implemented.

As a magnetic-modulation overwrite method, a so-called laser strobe magnetic-modulation method has been proposed, which aims to have a higher recording density than the simple magnetic-modulation method. To perform data recording by the laser strobe magnetic-modulation method, it is necessary that an external magnetic field modulated by recording data is applied and at the same time, the DSP 16 controls such that laser light pulses are emitted according to the clock timing (bit timing signal BT) of recording data.

In any of the above recording methods, the optical pickup 3 emits laser light having a power which causes the temperature on the recording surface of the disk 1 to rise to a so-called Curie point during recording, the bias magnet 4 applies a magnetic field to the recording surface of the disk 1, having the temperature which has rose to the Curie point by the laser light, then, the temperature of the recording surface decreases as the disk 1 rotates while the applied magnetic field remains, and recording is finished.

As for the power setting of the laser diode during recording, the most appropriate power value of the laser light to be emitted to the disk is recorded in a ROM area (also called a phase encoded part (PEP) zone) provided for the disk 1 at the most outer portion or the most inner portion.

Therefore, the DSP 16 sets the laser power for data recording according to the appropriate power value of the laser light read from the PEP zone of the optical disk.

In other words, the DSP 16 generates laser drive data for the laser driver 6 according to the appropriate power value of the laser light read from the PEP zone.

A CPU 19 is connected, for example, to the DSP 16 and the I/F control circuit 20 through the CPU bus, and controls the operations of the whole disk drive apparatus. For example, various types of control processing executed by the DSP 16 are performed under the control of the CPU 19.

Figure 6:
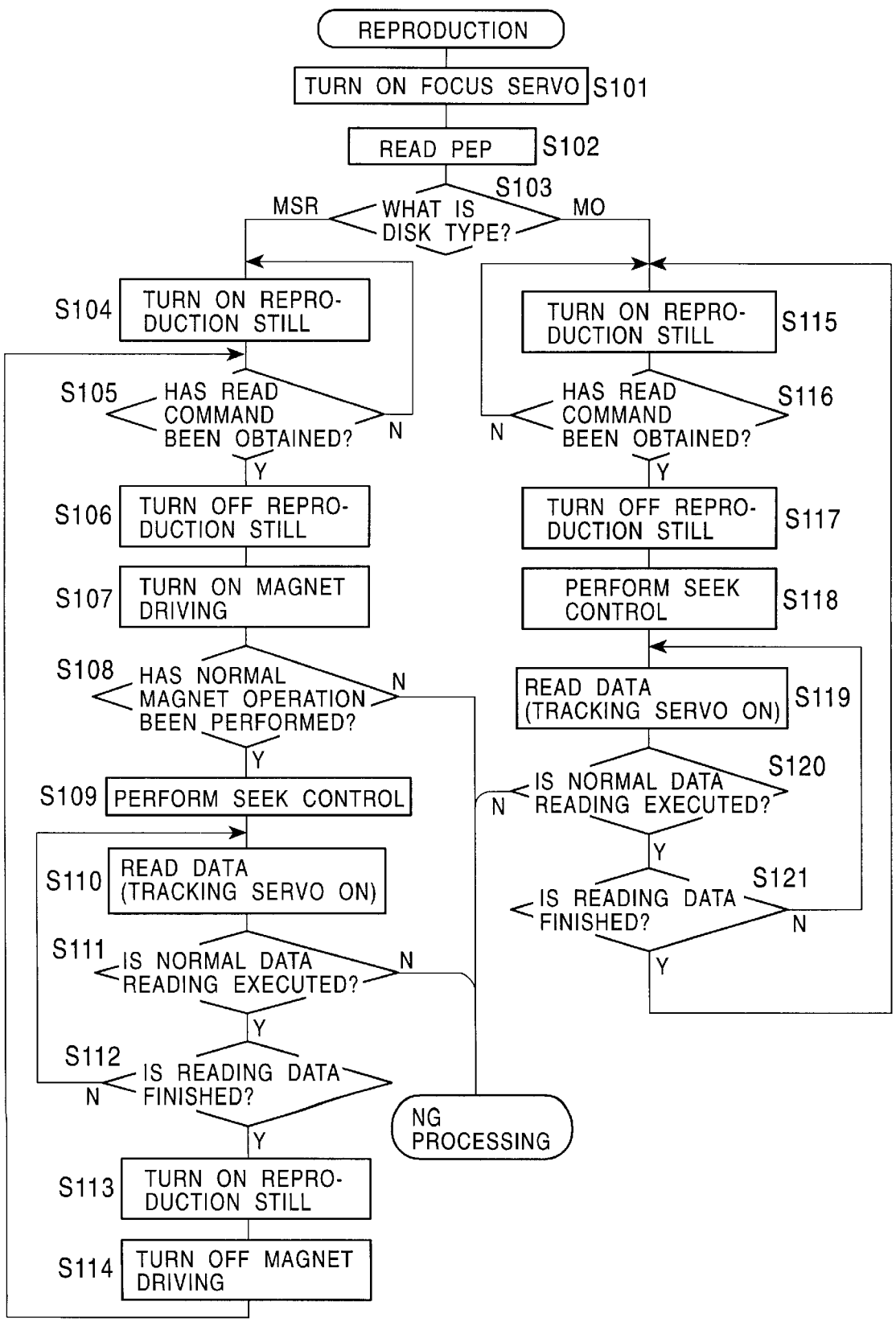
FIG. 6 is a flowchart indicating the processing of a data reproduction operation for the disk in the present embodiment.

Operations including control related to driving of the bias magnet 4 during data reproduction from a disk in the disk drive apparatus having the above structure will be described next by referring to a flowchart shown in FIG. 6. Processing shown in the figure is implemented when a function circuit section, including the DSP 16, executes required control processing in response to the control of the CPU 19.

When predetermined conditions are satisfied, such as a condition in which a command requesting the start of data reproduction from the inserted disk is sent from the host computer 23 to the CPU 19, the CPU 19 proceeds to a step S101.

In the step S101, disk-rotation driving control is, for example, performed and then a control process is executed to turn on a focus servo loop. When the processing illustrated in the figure is started, driving of the bias magnet 4 has been stopped. In other words, a magnetic field is not applied by the bias magnet 4.

The PEP-zone information, described before, is recorded, for example, as a bar code. When focus servo is executed, even if tracking servo is not performed, the PEP-zone information can be read.

In the PEP zone, information indicating the disk type is also recorded in addition to the laser power value. It is assumed that the disk type information includes identification information which allows an MO disk and an MSR disk to be identified.

The PEP-zone information is read while focus servo is being executed, in a step S102, and the disk type is determined in a step S103 according to the read information.

When it is determined in the step S103 that the disk type is an MSR disk, the processing proceeds to a step S104.

In the step S104, "reproduction still" is turned on. In the following step S105, the CPU 19 awaits until a read command (command for reading data) is obtained from the host computer 23.

"Reproduction still" indicates a condition in which the optical pickup 3 is placed at a given disk radius position without being moved when a data read operation (reading data from the disk and a read-data reproduction process) is not performed in the disk drive apparatus. In other words, it indicates a condition in which the sled is not moved. In this case, since a signal is not read from the disk, movement control of the objective by the two-axis mechanism in the disk radial direction may be unperformed. It is preferred, however, that the position of the objective be maintained according to the address information in the header shown in FIG. 1 by a jump performed every time the disk rotates by one turn.

When a read command is obtained in the step S105, the processing proceeds to a step S106 and "reproduction still" is turned off. In the following step S107, driving of the bias magnet 4 is turned on. The DSP executes control through the DSP bus such that the bias magnet 4 generates a biased magnetic field having a predetermined strength required for MSR reproduction. Then, in a step S108, it is determined whether a normal magnetic-field generation operation has been performed by the bias magnet 4. When an affirmative result is obtained, the processing proceeds to a step S109. In the step S109, seek control (control for moving the optical pickup 3 to an access position, and may accompany sled control) is executed to perform an access at the disk position corresponding to the read command obtained in the step S105. When the seek operation is finished, reading data at the access position is started in a step S110. At the start of this data reading, the tracking servo control provides with a condition in which the laser spot is ready to appropriately trace the track.

When a negative result is obtained in the step S108, it is deemed that an error has occurred and a predetermined NG processing (such as retry processing for return) is executed.

After reading data has been started in the step S110, it is determined first in a step S111 whether data is being read normally. When it is determined here that a data-reading error has occurred due to, for example, a servo release, the predetermined NG processing (such as a retry operation) is performed. When an error does not occur, the processing proceeds to a step S112.

In the step S112, the CPU 19 awaits until the data reading operation is finished for the data area corresponding to the read command. Until it is determined that the data reading operation is finished, the process from the step S110 is repeated.

When it is determined in the step S112 that the data reading operation has been finished, the processing proceeds to a step S113, "reproduction still" is turned on, and movement control (sled control) of at least the optical pickup 3 itself is stopped. Then, in a step S114, driving of the bias magnet 4, which has been performed so far, is stopped and the processing returns to the step S105.

Although the following case is not shown in the figure, when a command for stopping reproducing data is received from the host computer, for example, the processing immediately proceeds to a reproduction-end process.

In reproducing data from an MSR disk, the foregoing processing is executed. The bias magnet 4 is driven during data reading. When data reading is awaited in a condition in which "reproduction-still" is turned on, the bias magnet 4 is not driven.

Irrespective of whether data is being read or data reading is awaited, for example, even if the bias magnet 4 is driven constantly, no problem occurs in reproduction by the MSR method. When the bias magnet 4 is driven only during data reading as in the present embodiment, however, since a total output time for which the driving current is output to the bias magnet 4 becomes shorter than in a case in which, for example, the bias magnet 4 is constantly driven during data reproduction from an MSR disk, power consumption is reduced by the corresponding amount.

In the above embodiment, the bias magnet 4 is driven during the seek operation. Driving of the bias magnet 4 may be started after the seek operation is finished. This is because the MSR method may be unused since the access position can be detected during the seek operation if the address information in the header shown in FIG. 1 can be reproduced.

Although a detailed description is omitted here, when data is recorded into a conventional MO disk, for example, there is a case in which a bias magnet (magnetic head) is driven only when data is actually written into the disk and the bias magnet is not driven in a still condition in which data writing is awaited.

Therefore, magnet driving during reproduction in the present embodiment is a simplified process in which driving of the bias magnet 4 is turned on and off according to the timing of data reading. In addition, a control process for a recording operation such as that described above is applied. In other words, a complicated process or a complicated structure do not need to be added to the structure in the present embodiment, and the structure can be implemented very easily.

When it is determined in the step S103 that the disk is an MO disk, the processing proceeds to a step S115. A process from the step S115 is similar to the process from the step S104 to the step S114, described before, except that the process for turning on and off driving of the bias magnet 4 according to data reading is omitted.

More specifically, driving of the bias magnet 4 is constantly set to off. A read command is awaited in a condition in which "reproduction still" is set on (in steps from S115 to S116), "reproduction still" is turned off when a read command is obtained (in a step S117), and then seek control is executed (in a step S118). When the seek operation is finished, data reading is performed (in a step S119). Unless an error occurs in data reading, data reading is performed in the step S119 until data reading is finished (in steps from S120 to S121). When data reading at a certain access position is finished, the processing returns to the step S115.

Even during operations from the step S115, when a reproduction-stop command is received, the processing proceeds to a control process for stopping reproduction.

The present invention is not limited to the structure of the present embodiment. The disk drive apparatus of the present embodiment has the structure that has compatibility between an MO disk and an MSR disk and allows data to be recorded into and reproduced from both types of disks. The structure of the present invention is not so limited. The structure may also allow data to be recorded into and reproduced from disks of other types. The present invention is also applied to a disk drive apparatus that allows data to be recorded into and reproduced from only an MSR disk, and to a disk drive apparatus that allows data to be recorded into and reproduced from disks by methods other than the MSR disk and MO disk methods. The present invention is further applied to a reproduction-only apparatus that allows data to be reproduced from at least, for example, an MSR disk.

In the present embodiment, the structure for reproducing data from the MSR disk has been described. The present invention is of course applied to other disk reproduction methods that require an external magnetic field.

What is claimed is:

1. A reproduction apparatus for reproducing a signal recorded by magnetizing a recording layer, from a recording medium by transferring the direction of the magnetization to a reproduction layer, the apparatus comprising:
   a) an optical pickup for emitting laser light to a predetermined position on the recording medium;
   b) a magnetic-field generation means disposed correspondingly to said optical pickup, for applying a biased magnetic field to the recording medium for signal reproduction; and
   c) control means for performing at least:
      c1) a reproduction operation in which said optical pickup is moved above the recording medium and a signal is read from the recording medium, wherein said control means drives said magnetic-field generation means during the reproduction operation to apply a biased magnetic field to a position on the recording medium where laser light is irradiated; and
      c2) a still operation in which said optical pickup is held at a predetermined position above the recording medium and a signal is not read from the recording medium, wherein said control means stops driving said magnetic-field generation means during the still operation so as not to apply a biased magnetic field to the recording medium.

2. A reproduction apparatus according to claim 1, wherein said control means performs a seek operation in which said optical pickup accesses a predetermined position on the recording medium according to a read command sent from the outside, and stops driving said magnetic-field generation means during the seek operation so as not to apply a biased magnetic field to the recording medium.

3. A reproduction apparatus according to claim 1, wherein said control means comprises means for identifying the recording medium according to identification information indicating a medium type recorded into the recording medium, and drives said magnetic-field generation means to read a signal from the recording medium when it is determined that the recording medium conforms to a magnetically induced super resolution method.

4. A reproduction method for reproducing a signal recorded by magnetizing a recording layer, from a recording medium by transferring the direction of the magnetization to a reproduction layer, the method comprising:
   a) determining the type of the recording medium by emitting laser light to a predetermined position on the recording medium;
   b) applying a biased magnetic field for signal reproduction to a position where the laser light is irradiated, according to the determination result; and
   c) controlling to perform at least:
      1) a reproduction operation for reading a signal from the recording medium; and
      2) a still operation in which an optical pickup is held at a predetermined position above the recording medium and a signal is not read from the recording medium, and a biased magnetic field is not applied to the recording medium during the still operation.

5. A reproduction method according to claim 4, wherein, in said controlling step, a seek operation is performed in which the optical pickup accesses a predetermined position on the recording medium according to a read command sent from the outside, and a biased magnetic field is not applied to the recording medium during the seek operation.

* * * * *